(No Model.)

J. C. FROST.
SPRAYING DEVICE FOR TOBACCO CASING MACHINES.

No. 519,425. Patented May 8, 1894.

Witnesses

Inventor
John C. Frost
by Mason Fenwick & Lawrence
his Attorneys

THE NATIONAL LITHOGRAPHING COMPANY,
WASHINGTON, D. C.

UNITED STATES PATENT OFFICE.

JOHN C. FROST, OF WINSTON, NORTH CAROLINA.

SPRAYING DEVICE FOR TOBACCO-CASING MACHINES.

SPECIFICATION forming part of Letters Patent No. 519,425, dated May 8, 1894.

Application filed June 12, 1893. Serial No. 477,255. (No model.) Patented in Canada November 5, 1892, No. 40,922.

*To all whom it may concern:*

Be it known that I, JOHN C. FROST, a citizen of the United States, residing at Winston, in the county of Forsyth and State of North Carolina, have invented certain new and useful Improvements in Spraying Devices for Tobacco-Casing Machines, (a patent for which was granted to me in Canada November 5, 1892, No. 40,922;) and I do hereby declare the following to be a full, clear, and exact description of the invention, such as will enable others skilled in the art to which it appertains to make and use the same.

My invention relates to a spraying nozzle for a tobacco casing machine which delivers the sweetening or flavoring fluid to tobacco during the casing operation in the form of a sheet spray, the spray of the flavoring fluid being capable of being regulated as will be hereinafter described and claimed.

Figure 1:
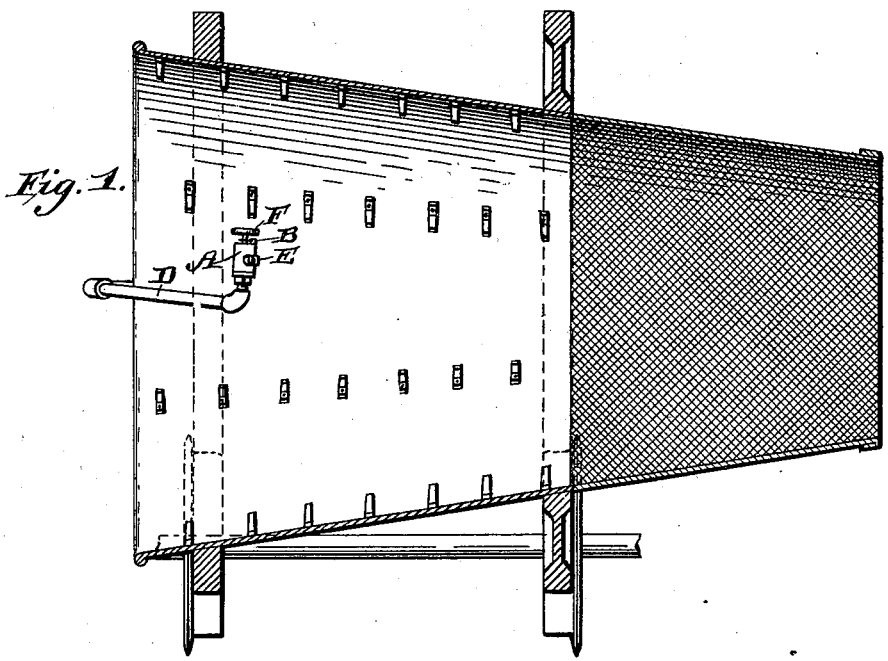
Figure 2:
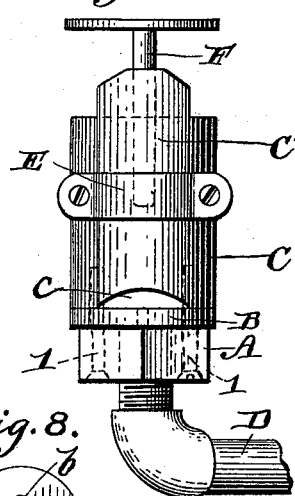
Figure 3:
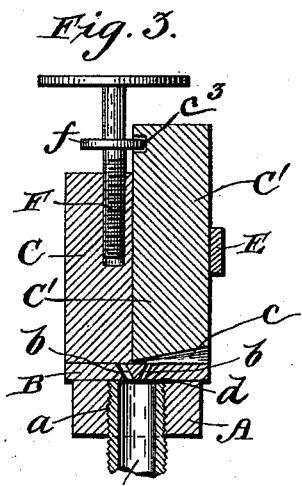
Figure 4:
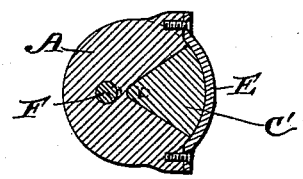
Figure 5:
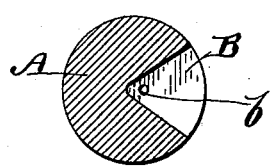
Figure 8:
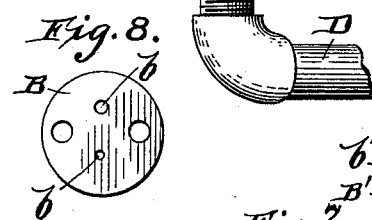
Figure 7:
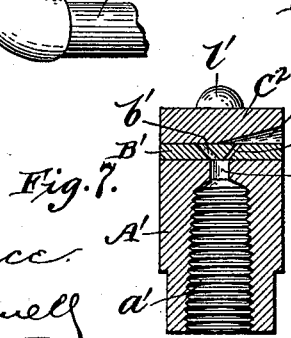
Figure 6:
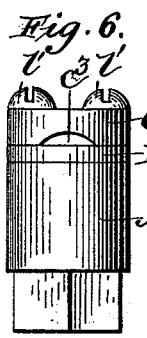
Figure 9:
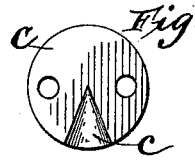

In the accompanying drawings Figure 1 is a longitudinal section of the casing drum or reel, the screening drum and the spraying device. Fig. 2 is a side elevation of the spraying device. Fig. 3 is a vertical section through the same. Fig. 4 is a transverse section through the line $x\,x$ of Fig. 2. Fig. 5 is a transverse section through the spraying device with the vertical adjustable bar or gate removed. Fig. 6 is a side elevation of a slightly modified form of the spraying device, the sliding bar or gate being dispensed with. Fig. 7 is a vertical section through the same. Fig. 8 is a detail plan view of regulating plate shown in Fig. 7 and Fig. 9 is a detail plan view of the deflector shown in said figure.

A in the drawings as shown in Figs. 2 and 3, represents the body of the spraying nozzle, B a spray regulating plate, C a deflecting cap and C' a sliding cleaning gate or bar forming a part of the deflecting cap, the parts being secured together by screws $l, l$, as shown. The body of the nozzle has a central passage $a$ which connects with a flavoring liquid conducting pipe D as shown.

The spray regulating device B consists of a plate provided with two or more diverging holes $b, b$, of different sizes for the purpose of regulating the spray as will be hereinafter described. The sliding bar of the deflecting cap is formed with a flaring diverging orifice $c$ which when the cap is applied to the spray regulating plate, forms a spreading opening for the discharge of the sweetening mixture. By removing the screws $l, l$ the spray regulating plate can be so turned that when the parts are properly united again, the spreading discharge opening $c$ will register or communicate with any one of the holes $b$ desired, so that the spray can be readily and quickly increased or diminished. The cleaning sliding bar or gate C' consists of a V or other suitably shaped piece which is held in contact with the body portion of the cap C by a fastening band as E which is formed at its lower end with an upwardly and outwardly flaring discharging orifice $c$ which forms a deflector for the discharge of the flavoring liquid. By making the bar or gate, V or wedge shaped, the inner edge of the same is brought to the center of the cap and permits the liquid to diverge and spread from said point to the circumference of the flaring orifice.

The sliding bar or gate is for the purpose of freeing the inner end of the flaring orifice $c$ from any sediment or matter which may have collected there and would clog the same and obstruct the discharge of sweetening liquid, and this is accomplished by raising the sliding bar or gate by means of the screw F, which latter is provided with a collar $f$ and works in a recess $c^3$ in said bar, whereupon by turning the screw, the sliding bar can be adjusted as desired and the clogging matter is free to be forced out by the discharging liquid.

Figs. 6 and 7 show a modification in my spraying nozzle which consists of a main part or body A' provided with a threaded orifice $a'$ to receive the pipe upon which it is to be used, which orifice terminates in a smaller orifice $d$, as shown; a regulating plate B' having two or more diverging orifices $b'\,b^2$ of different sizes and a cap deflector $c^2$ having a spreading groove $C^3$. The body A', plate B' and cap $C^2$ are secured together by bolts $l'\,l'$ and the plates are so arranged that the groove $C^3$ lies over and communicates with either of the orifices $b'$ $b^2$ with which it is desired to be used. By unscrewing the bolts $l'$ $l'$, and changing the position of the plate $b'$, any desired orifice may be brought into use in connection with the groove $C^3$.

What I claim is—

1. In a spraying nozzle for a tobacco casing machine, the combination of a main body portion, a cap provided with a discharge orifice and capable of adjustment to vary the size of said orifice, a spray regulating disk provided with discharge passages of different diameters, said disk being capable of rotation and adjustment concentrically with the body of the nozzle, and means for locking the disk in different positions when the different sized openings are brought in alignment with the discharge orifice, substantially as set forth.

2. In a spraying nozzle for tobacco casing machines, the combination of a main body portion provided with a central screw-threaded aperture, a disk provided with diverging apertures, and a deflecting cap provided with a spreading groove on its under side; said disk and cap being so arranged that when one of the apertures corresponds in position, with said spreading groove, it will produce a fan like spray, substantially as set forth.

3. In a spraying nozzle for a tobacco casing machine, the combination of a main body portion, a spray regulating plate a cap portion therefor comprising a vertically adjustable bar or gate for freeing the nozzle of obstructing matter provided at its lower end with a deflecting discharge orifice which communicates with an opening in the regulating plate, substantially as described.

4. In a spraying device for a tobacco casing machine, the combination of a main body portion, a spray regulating plate a cap portion, a vertically adjustable gate or bar provided at its lower end with an outwardly and upwardly flaring discharge opening which communicates with an opening in the cap portion, and a screw for raising and lowering the said bar or gate, substantially as described.

In testimony whereof I hereunto affix my signature in presence of two witnesses.

JOHN C. FROST.

Witnesses:
E. W. GRIGG,
EUGENE E. GRAY.